United States Patent [19]

Pandolfi

[11] 4,213,544

[45] Jul. 22, 1980

[54] WATER PROPORTIONING AND DELIVERING DEVICE PARTICULARLY FOR COFFEE MACHINES

[76] Inventor: Alberto S. Pandolfi, c/o Ing. Misitano A.G. Via Padova, 217, 20127 Milano, Italy

[21] Appl. No.: 972,889

[22] Filed: Dec. 26, 1978

[51] Int. Cl.² ............................................. G01F 11/06
[52] U.S. Cl. ................................... 222/250; 222/340; 417/328; 417/555 R
[58] Field of Search ............ 222/250, 309, 334, 335, 222/340, 341; 73/239; 417/328, 555 R; 91/275, 437; 60/547 R, 593

[56] References Cited

U.S. PATENT DOCUMENTS

| 2,909,315 | 10/1959 | Sampietro | 91/275 X |
| 3,095,125 | 6/1963 | Bundy | 222/335 X |
| 3,292,824 | 12/1966 | Arp et al. | 222/250 |
| 3,653,545 | 4/1972 | Tanner | 222/250 X |
| 3,657,925 | 4/1972 | Gross | 73/239 |

*Primary Examiner*—Robert J. Spar
*Assistant Examiner*—Fred A. Silverberg

[57] ABSTRACT

A device for dispensing a measured volume of liquid such as hot water for a coffee making machine in which the liquid is delivered to and dispensed from a cylinder having a double-acting piston the stroke of which is limited and controlled by an external microswitch which is remotely operated by the piston without physical contact, e.g., magnetically, at a predetermined point in its stroke.

1 Claim, 5 Drawing Figures

WATER PROPORTIONING AND DELIVERING DEVICE PARTICULARLY FOR COFFEE MACHINES

BACKGROUND OF THE INVENTION

This invention relates to improvements in devices for dispensing a measured volume of liquid and is particularly concerned with such dispensing devices as are used for dispensing hot water in coffee-making machines.

Such dispensing devices generally comprise a double-acting piston which is reciprocable in a cylinder to which water is pumped to one side of the piston so that the latter is displaced by the water from an initial position against the effect of a return spring. During this stroke of the piston water which has been transferred from the one side of the piston to the other is expelled from the cylinder to a filter carrying cup to make coffee. The piston carries a piston rod which extends externally of the cylinder and which, after a predetermined displacement of the piston from the initial position, actuates an externally located microswitch to switch off the pump and hence stop the supply of water to the cylinder, thereby limiting the stroke of the piston and controlling the quantity of water supplied to the cylinder. The position of the microswitch is adjustable so that by adjustment thereof, volume of water dispensed may be controlled. When the microswitch is actuated, the supply of water from the cylinder to the filter carrying cup ceases to discontinue the infusion stage and the filter carrying cup is placed in communication with the atmosphere so as to obtain a partial drying of the coffee grounds by decompression.

In such known devices, the water, usually hot water, is fed to the cylinder at a pressure approaching 9 atmospheres and packing is required to seal the piston rod which extends externally of the cylinder. Such packing usually has a limited life and is expensive to provide and replace.

It is an object of the present invention to provide an improved device for dispensing a measured volume of liquid, particularly hot water for a coffee-making machine, in which the disadvantages of the known devices referred to above are substantially eliminated.

It is a more particular object of the present invention to provide an improved device for dispensing a measured volume of liquid, particularly hot water for a coffee-making machine in which the necessity for a packing to seal a piston rod associated with the dispensing cylinder is entirely removed.

BRIEF SUMMARY OF THE INVENTION

The above objects of the present invention are achieved by a construction of dispensing device in which the microswitch is operated remotely and without physical contact so that there is no requirement for a piston rod to extend externally of the dispensing cylinder.

Accordingly, the invention provides in a device for dispensing a measured volume of liquid which device comprises a cylinder for receiving the liquid, a piston slidable in the cylinder to control the volume of liquid supplied thereto and to dispense liquid therefrom and external switch means responsive to the length of stroke of the piston to control the stroke of the piston in the cylinder the improvement which comprises switch operating means located wholly in the cylinder and displaceable with the piston and operable remotely to actuate the external switch means in the absence of physical contact therewith.

The invention further provides in a device for dispensing a measured volume of hot water for the production of coffee in a coffee machine, the device comprising a cylinder, a double-acting piston slidable in the cylinder, valve means for supplying water to said cylinder to one side of the piston to displace the piston away from an initial position and dispense water from said cylinder from the other side of the piston, spring means operable to oppose displacement of the piston away from said initial position and a switch means disposed externally of said cylinder and operated by displacement of said piston to control said water supplying means and limit displacement of the piston away from said initial position, the improvement which comprises mounting wholly within said cylinder a mass of magnetic material displaceable with said piston and generating a magnetic field extending externally of said cylinder and displaceable with the piston along a predetermined path and constructing said switch means as a magnetically responsive micro-switch disposed at a predetermined location in said predetermined path and responsive to a predetermined displacement of said piston from said initial position to control said water supplying means to terminate the supply of water to said cylinder and terminate the displacement of the piston away from said predetermined position.

DETAILED DESCRIPTION OF THE DRAWINGS

Figure 1:
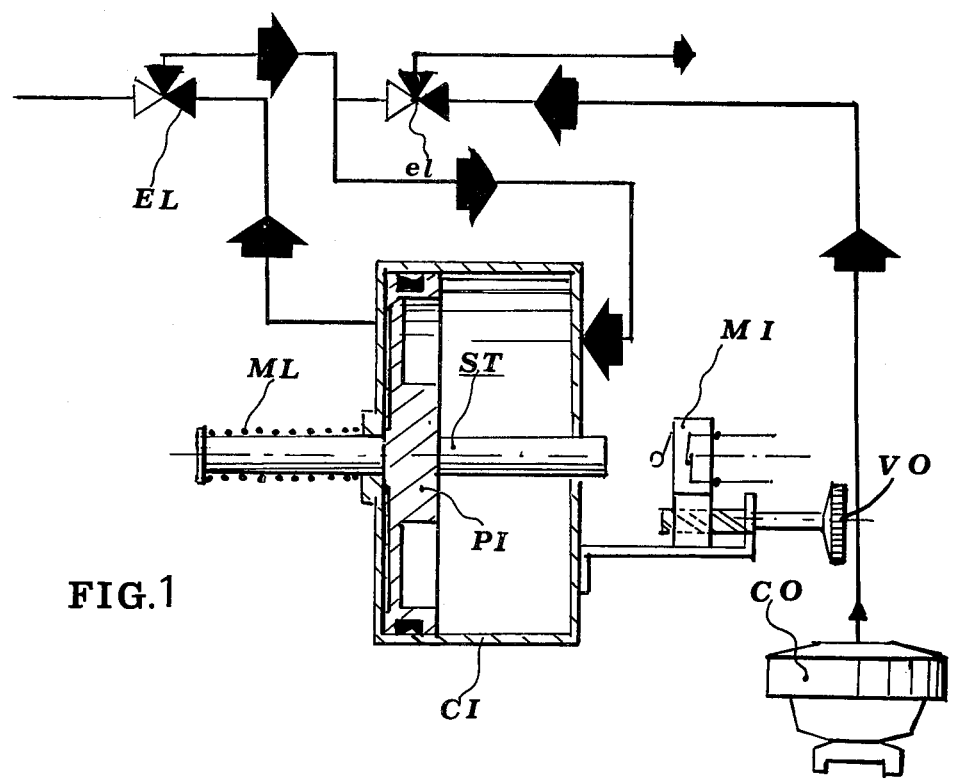
FIG. 1 is a schematic view of a known device for dispensing a measured quantity of hot water in a coffee making machine shown in an initial position.
Figure 2:
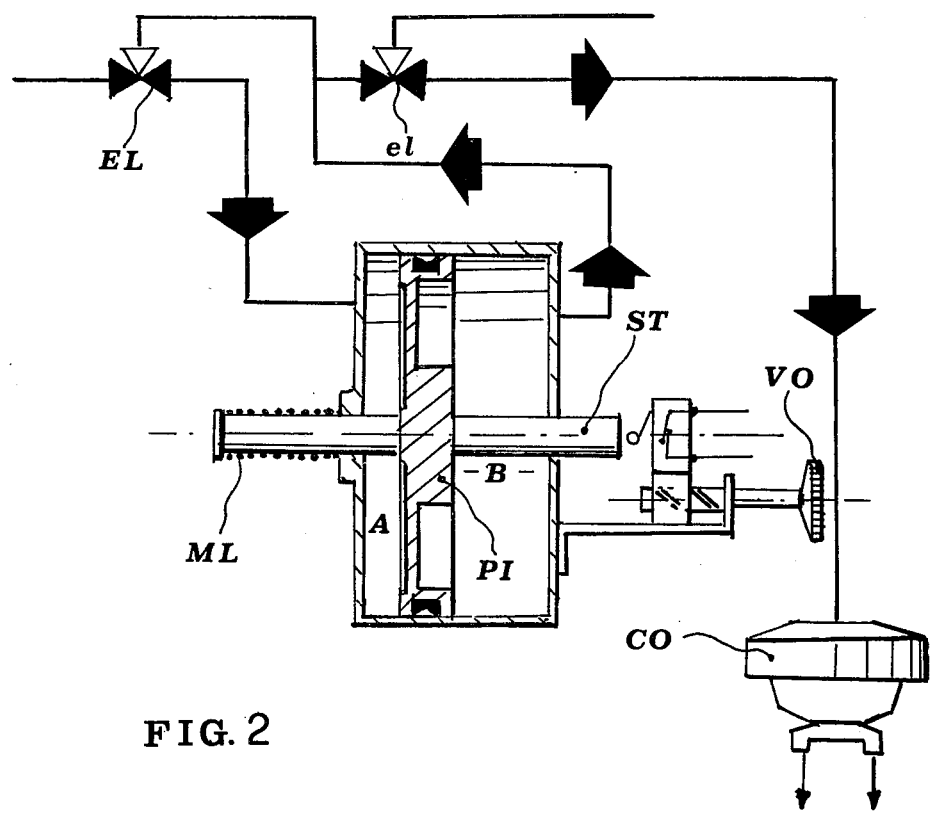
FIG. 2 shows the device of FIG. 1 in a position in which hot water is being dispensed.
Figure 5:
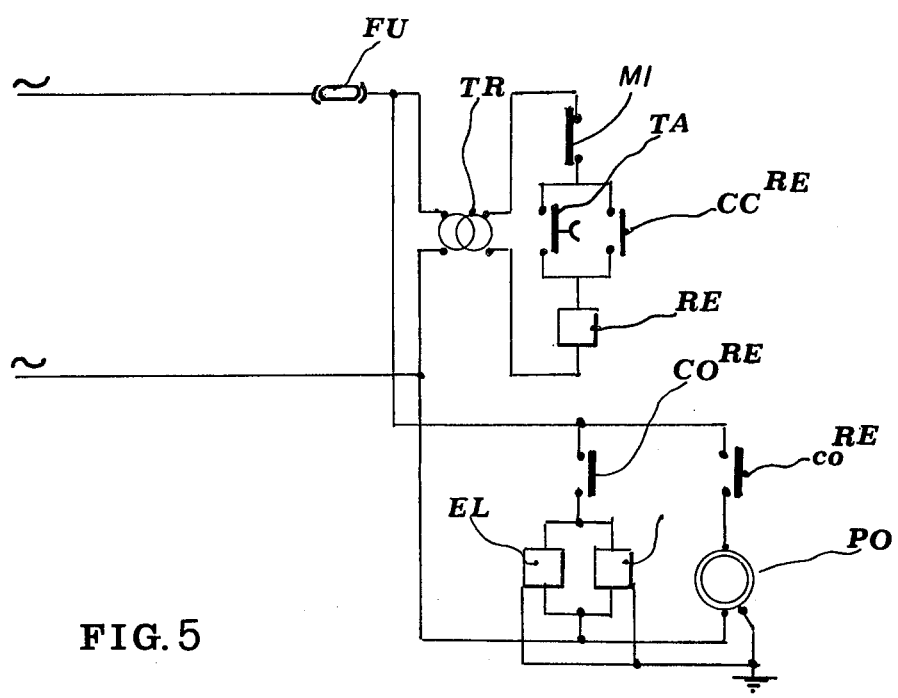
FIG. 5 is a circuit diagram illustrating the electrical control for both the known device illustrated in FIGS. 1 and 2 and the dispensing device according to the present invention illustrated in FIGS. 3 and 4.

The dispensing device illustrated in FIGS. 1 and 2 comprises a cylinder CI in which is reciprocably mounted a double acting piston PI to which is attached a piston rod ST which extends externally of the cylinder for displacement with the piston. One side of the piston PI communicates through an electromagnetically controlled three-way valve EL with a supply of hot water which is supplied under pressure by a pump PO (FIG. 5). When such hot water is being supplied as shown in FIG. 2, the piston is displaced thereby away from the initial position shown in FIG. 1 against the effect of a return spring ML, the hot water being supplied to the chamber A in the cylinder CI and hot water being expelled from the chamber B on the other side of the piston through a second electromagnetically controlled three-way valve el to a filter carrying cup CO. A microswitch MI is disposed in the path of travel of the piston rod ST so as to be actuated thereby to stop the pump PO and discontinue the supply of hot water to the cylinder CI and hence terminate the stroke of the piston PI. The microswitch MI is mounted for adjustment by a hand wheel VO so that its position relative to the path of travel of the piston rod ST can be adjusted. When the piston rod ST actuates the microswitch MI to terminate the stroke of the piston PI, the piston returns to its initial position under the influence of return spring ML and the hot water which has been delivered to the chamber A is expelled from the chamber A, through valve EL to the chamber B as can be seen in FIG. 1. Thus, the quantity of hot water delivered to the chamber A and hence to the chamber B is controlled by actuation of the microswitch MI and is adjustable by adjustment of the position of the microswitch.

As can be seen from FIG. 5, the control circuit comprises a control key TA which, when actuated, energises relay RE to close contacts $CC^{RE}$, $CO^{RE}$ and $co^{RE}$. Closure of contact $CC^{RE}$ maintains relay RE energised. Closure of contact $CO^{RE}$ energises the valves el and EL from the de-energised condition shown in FIG. 1 to the energised condition shown in FIG. 2. Closure of contact $co^{RE}$ energises the pump PO. FU is a fuse and TR a 220-240 V. trasformer.

In the de-energised condition, the valve el places the filter carrying cup CO in communication with the atmosphere to cause drying of the coffee grounds in known manner. In the de-energised condition of the valve EL chambers A and B of the cylinder are in communication with each other for the transfer of the measured quantity of hot water from chamber A to chamber B while delivery of hot water from the chamber B is discontinued.

When the control key is actuated, the valves el and EL are energised to the condition shown in FIG. 2 and the pump PO is energised to pump water to the chamber A, displace the piston PI and expel the measured quantity of hot water from chamber B through the valve el to the filter cup CO. When the piston rod ST engages the normally closed microswitch MI, the relay coil RE is de-energised and the contacts $CC^{RE}$, $CO^{RE}$ and $co^{RE}$ open to de-energise the valves EL and el and the pump PO. The piston PI returns to its initial position transferring hot water from chamber A to chamber B and the filter cup CO is placed in communication with the atmosphere to dry the coffee grounds by decompression.

It will be appreciated that the externally projecting piston rod ST produces sealing problems having regard to the temperature and pressure of the water and the sliding movement of the rod.

Figure 3:
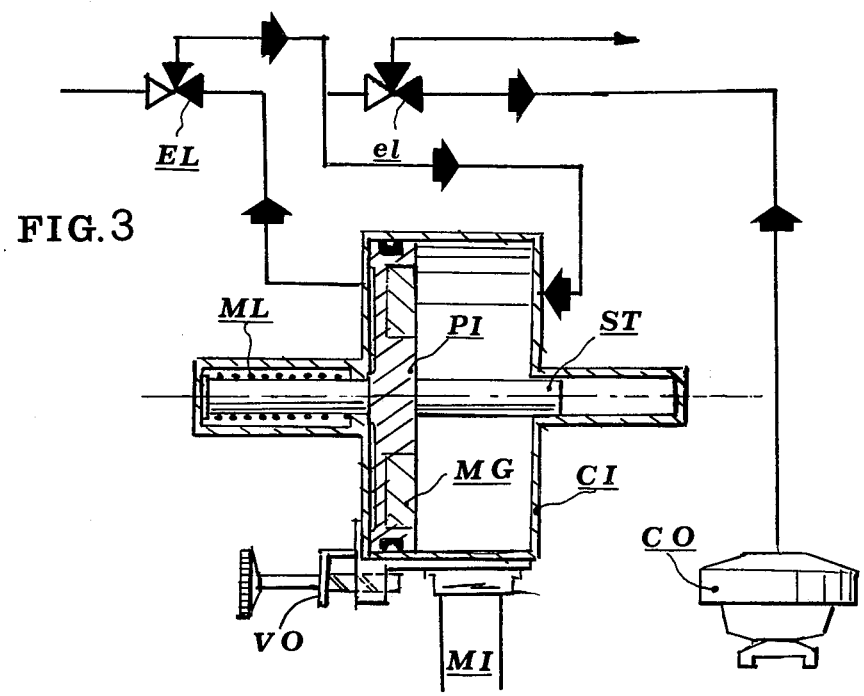
FIG. 3 is a view similar to FIG. 1 illustrating a dispensing device according to the present invention.
Figure 4:
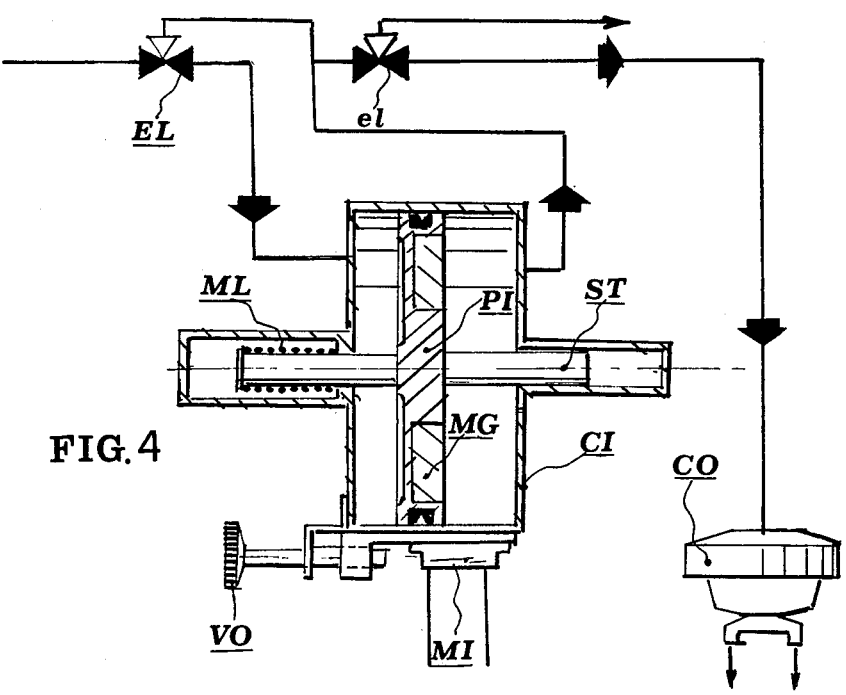
FIG. 4 is a view similar to FIG. 2 but showing the embodiment of FIG. 3 in the hot water dispensing condition.

In the embodiment constructed in accordance with the present invention and illustrated in FIGS. 3 and 4, like parts are indicated by like references which are underscored. In this case, the piston rod ST is contained wholly within the cylinder CI. The piston PI carries an annular mass MG of magnetic material concentrically disposed about its axis reciprocation and a Reed microswitch MI responsive to the magnetic field of the mass MG is disposed externally of the cylinder CI in the path followed by the magnetic field MG by displacement of the piston PI. The position of the Reed microswitch MI is adjustable by the handwheel VO so that the point in the stroke of the piston PI at which the microswitch is actuated may be controlled. The operation of this arrangement is similar to that described with reference to FIGS. 1 and 2 and will be understood therefrom.

The piston rod ST shown in FIGS. 3 and 4 is used merely for guidance of the piston PI which can be of sufficient axial dimension to be guided by the cylinder wall so that the piston rod may be entirely omitted. Also, it will be noted that in the arrangement shown in FIGS. 3 and 4 and unlike the known arrangement shown in FIGS. 1 and 2, the return spring ML is entirely housed within the cylinder to further avoid the problem of seals and packings.

It will be appreciated that the construction according to the invention eliminates the need for a piston rod or other moving part associated with the piston to extend externally of the cylinder so that the problems associated with seals and packings are entirely eliminated.

It is evident from the foregoing that in lieu of a Reed microswitch, other similar components may find an equivalent application: in effect the principle of this invention should be seen in the actuation by a magnetic way namely without physical contact of this microswitch.

The preceding description makes it evident that the mentioned objects of the invention have been fully attained. In the light of the disclosure changes and modifications within the true spirit and scope of the invention will occur to others, and accordingly it is not desired that the scope of the invention be restricted except as is required by the appended claims.

What is claimed is:

1. A water proportioning and delivering device particularly for coffee machines comprising a cylinder for receiving the liquid, a double acting piston slidable in the said cylinder to control the volume of liquid supplied thereto and to dispense liquid therefrom, the said double acting piston comprising a first and a second piston rod, the said cylinder extending with a first and a second hollow portion sized to receive the said first piston rod and said second piston rod and external switch means responsive to the length of stroke of the piston to control the stroke of the piston in the cylinder, switch operating means comprising a magnetic mass disposed concentrically about the axis of displacement of the piston and the switch means comprising a magnetically responsive microswitch disposed externally of the cylinder at a location in the path of travel of the magnetic field associated with the magnetic mass, a return spring mounted around the first piston rod and housed within the said first hollow portion and operable to return the piston to an initial position, the second hollow portion of the cylinder operating as a guide for the said second piston rod, adjusting manually actuated means for the said switch means able to adjust the location of the latter along a generatrix of the said cylinder.

* * * * *